United States Patent [19]
Gondard et al.

[11] Patent Number: 5,266,637
[45] Date of Patent: Nov. 30, 1993

[54] PROCESS FOR GRAFTING FUNCTIONS ONTO CHLORINATED (CO)POLYMERS, COMPOSITIONS AND SHAPED OBJECTS

[75] Inventors: Christian Gondard, Roanne; Alain Michel, Lyons, both of France

[73] Assignees: Centre National de la Recherche Scientifique, Paris; Sotra Industries, Andresy, both of France

[21] Appl. No.: 773,884
[22] PCT Filed: Dec. 28, 1990
[86] PCT No.: PCT/FR90/00968
§ 371 Date: Oct. 28, 1991
§ 102(e) Date: Oct. 28, 1991
[87] PCT Pub. No.: WO91/09884
PCT Pub. Date: Jul. 11, 1991

[30] Foreign Application Priority Data
Dec. 28, 1989 [FR] France ................. 89 17359

[51] Int. Cl.$^5$ .............. C08F 8/42; C08F 8/26; C08F 8/30; C08F 14/06
[52] U.S. Cl. .................. 525/104; 525/102; 525/330.7; 525/331.3; 525/331.4; 525/331.5; 525/342; 525/360; 525/374; 525/385; 525/479; 526/291; 526/344; 526/345
[58] Field of Search ......... 525/104, 331.5, 342, 525/479; 526/345, 344

[56] References Cited
U.S. PATENT DOCUMENTS

| | | | |
|---|---|---|---|
| 3,494,905 | 2/1970 | Tyran | 525/62 |
| 4,291,136 | 9/1981 | Keogh | 525/102 |
| 4,343,917 | 8/1982 | Keogh | 525/106 |

FOREIGN PATENT DOCUMENTS
0101541 1/1986 European Pat. Off.

OTHER PUBLICATIONS
Chemical Abstracts, vol. 77, No. 14, Oct. 2, 1972, Columbus, Ohio, USA; J. Masoijdek: "Substitution reactions of poly(vinyl chloride)" ref. No. 88846D, see abstract & Chem. Listy 66(5), 458-78, (1972).

*Primary Examiner*—Joseph L. Schofer
*Assistant Examiner*—Fred Zitomer
*Attorney, Agent, or Firm*—Browdy and Neimark

[57] ABSTRACT

The present invention relates to functionalized chlorinated (co)polymers and methods for their preparation. The functionalization is performed with an organometallic compound where the metal may be tin, lead, antimony or bismuth. The organic groups are hydrocarbons which may be substituted and one group is either a secondary amine or an ether which is eventually substituted by a trialkoxysilane or a hydroxy group. The preferred chlorinated polymer is PVC and the preferred functionalizing agent is an organotin compound.

15 Claims, No Drawings

PROCESS FOR GRAFTING FUNCTIONS ONTO CHLORINATED (CO)POLYMERS, COMPOSITIONS AND SHAPED OBJECTS

The present invention relates to a process for grafting functions onto chlorinated polymers or copolymers, compositions and shaped objects.

The functionalization (or grafting of chemical functions) of thermoplastic polymers during implementation is an advantageous way of giving them new properties such as adhesion, the ability to fix colours in a non-reversible way or improving their compatibility with other polymers. It also allows the addition of photostabilizers or additives of organic or mineral origin such as fillers. Also it notably allows post-cross-linking.

The functionalization route for chlorinated polymers by copolymerization of functionalized monomers has major inconveniences such as the disturbance, of a chemical nature, of the polymerization processes leading to agglomeration processes and modification of particle morphology. This route generally requires the producers to prepare special batches as a function of the comonomer and of its content in the copolymer.

The functionalization route by photochemical route of poly(vinyl chloride) by electron bombardment or by gamma irradiation by subjecting the polymer to these radiations in the presence of a monomer such as, for example, hexyl-2-ethyl acrylate has the inconvenience of causing its degradation by the elimination of hydrogen chloride.

The chemical route by nucleophilic substitution reaction of the chlorine atoms of the chlorinated polymer by sulphurated compounds also has the inconvenience of rendering said copolymer very sensitive to UV radiations which initiate radical-like degradation reactions the initiation phase of which is the radical-like cutting of disulphide bridges which are always present as impurities in these compounds.

The grafting of alkoxysilane functions onto polyethylene or the copolymers of ethylene and an alkyl acrylate followed by their cross-linking by a condensation reaction of the alkoxysilanes in the presence of water is described in the literature, for polyethylene, for example, in the British Patent 1,286,460 or in the U.S. Pat. Nos. 4,291,136 or 4,328,323 for the copolymers of ethylene and an alkyl acrylate.

It is also known that alkoxysilane groups can be grafted onto polyvinyl chloride during implementation operations in the molten state in the presence either of an aminoalkoxysilane (GILBERT Polymer Communications Vol. 31, pages 194-197, 1990), or in the presence of mercaptoalkoxysilane (KELNAR and SCHATZ Preprints 31st Microsymposium sur les Macromolecules PVC Prague, Jul. 18/21, 1988). Once grafted, the polymer is cross-linkable in the presence of water. In the first case the basicity of the aminoalkoxysilane makes the polymer sensitive to degradation and in the second case, the presence of mercaptans makes the polymer sensitive to photochemical ageing.

The hydroxylation of ethylene—vinyl acetate copolymers during the extrusion phase by transesterification of the acetate groups in the presence of an alcohol is described in the literature.

On the other hand, the only route used up until now for the hydroxylation of chlorinated polymers or chlorinated (co)polymers such as for example polyvinyl chloride, is the copolymerization of vinyl chloride and functionalized vinyl monomers containing alcohol functions such as acrylic or methacrylic esters. Another possible route is the hydrolysis of acetate functions of a chlorinated (co)polymer and vinyl acetate but this hydrolysis cannot be carried out during a working operation such as extrusion, calendering, injection or coating.

It would be most useful to be able to functionalize the chlorinated polymers and copolymers and more particularly, in a non-limitative fashion, poly(vinyl chloride) with alkoxysilane functions either at the moment of implementing in the extrusion, calendering, coating or injection process and in the absence of a solvent, or by the dry-blend technique, or in suspension in an organic liquid, advantageously in a hydrocarbon controlling the functionalization rate as a function of the desired application.

It would also be very useful to be able to functionalize chlorinated polymers and copolymers and more particularly, in a non-limitative fashion, polyvinyl chloride, with hydroxyl functions at the moment of implementing/starting the extrusion, calendering, coating or injection process and in the absence of a solvent, controlling the functionalization rate as a function of the desired application.

This is why an object of the present Application is a functionalization process for chlorinated polymers or (co)polymers, hereafter chlorinated (co)polymers, characterized in that said chlorinated (co)polymer is reacted at a temperature of 20° to 250° C. with an organometallic derivative of formula (I):

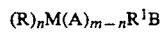

in which:

M represents a lead, antimony or bismuth atom, and preferably a tin atom,

A represents:
either an $NR^3$ group in which $R^3$ represents a hydrogen atom or an $R^1B$ radical,
or an oxygen atom, m is equal to 4 and n is equal to 1, 2 or 3 when M represents tin or lead, m is equal to 5 and n is equal to 1, 2, 3 or 4 when M represents bismuth or antimony, R represents a linear or branched alkyl radical containing 1 to 8 carbon atoms, a cycloalkyl radical containing 3 to 12 carbon atoms, an optionally substituted aryl radical containing 6 to 14 carbon atoms, an optionally substituted aralkyl radical containing 7 to 14 carbon atoms or a cycloalkylalkyl radical containing 4 to 8 carbon atoms, $R_1$ represents a linear or branched alkyl radical containing 1 to 20 carbon atoms, an aralkyl radical containing 7 to 14 carbon atoms, a cycloalkyl radical containing 3 to 12 carbon atoms, an optionally substituted cycloalkylalkyl radical containing 4 to 8 carbon atoms or an arylcycloalkyl radical containing 7 to 20 carbon atoms or a polymer chain, said $R^1$ radical being optionally functionalized, and B represents either (1) an $-Si(OR^2)_3$ radical, $R^2$ being able to take the values of R above, but preferably methyl or ethyl, or a $-(OH)_x$ radical in which x represents an integer which can take values from 1 to 41 and preferably from 1 to 10, said $-R^1(OH)_x$ radical preferably being a polyol such as ethylene glycol, trimethylolpropane or pentaerythrol.

By "organometallic derivative", is meant that the R radical is linked to the metal atom by the intermediary of a metal-carbon bond of covalent type and the nitrogen or oxygen atom is also linked to the metal atom by a covalent bond.

The expression "linear or branched alkyl radical" preferably designates a methyl, ethyl, n-butyl or n-octyl radical.

The expression "cycloalkyl radical containing 3 to 6 carbon atoms" preferably designates a cyclopropyl, cyclobutyl or cyclohexyl radical.

The expression "aryl radical containing 6 to 14 carbon atoms" preferably designates a phenyl radical.

The expression "aralkyl radical containing 7 to 14 carbon atoms" preferably designates a benzyl or phenethyl radical.

The expression "cycloalkylalkyl radical containing 4 to 8 carbon atoms" preferably designates a cyclopropylmethyl radical.

The linear or branched alkyl radical containing 1 to 20 carbon atoms preferably contains 2 to 6 carbon atoms.

When a carbon atom, for example of an aryl radical is substituted, it is preferably substituted by an ethyl, methyl, methoxy radical or by a chlorine atom.

When the $R^1$ radical is functionalized, it is understood that the radical which is represented by $R_1$ can be optionally substituted by a function which is not capable of destroying the reagents employed, such as an ether or thioether function.

According to the invention, the organometallic compound can be synthesized either before its introduction into the (co)polymer, or in situ.

In the case where B represents an $Si(OR^2)_3$ radical, when A represents an oxygen atom, the organometallic compound defined previously is a tin, lead, antimony or bismuth organometallic alcoholate. Its preparation can be carried out beforehand or in situ, by reaction, in the case of tin, for example, of a methoxyorganotin on a hydroxyalkyl(trialkoxysilane) ester; in an example of preparation in situ, an organostannic oxide is reacted on a hydroxyalkyl(trialkoxysilane) ester, and advantageously hydroxypropyltrimethoxysilane. In this case, and according to the invention, to synthesize the alkoxyorganometallic derivative, this compound can be prepared before its introduction or in the chlorinated polymer or copolymer by the reaction of propyltrimethoxysilane methacrylate with an alkoxyorganometal of the metals mentioned previously and advantageously, generally with a mono alcoholate or an organometallic polymethoxy, when A represents an $NR^3$ group, the organometallic compound is advantageously synthesized before its introduction into the (co)polymer. The organometallic tin, lead, antimony or bismuth compound is therefore preferably a compound derived form a molecule containing an amine function and at least one or two trialkoxysilane groups, for example 2, 3 or 4 such groups. According to the present invention, there can be advantageously mentioned aminopropyltriethoxysilane. In this case, and according to the invention, to synthesize the aminoorganometallic derivative, it is necessary to prepare this compound before its introduction into the chlorinated polymer or copolymer by reaction of the aminopropyltriethoxysilane with an alkoxyorganometal of the metals mentioned previously, notably an alkoxyorganotin, and advantageously with a mono alcoholate or a polymethoxyorganometallic alcoholate.

In the case where B represents an $(OH)_x$ radical, when A represents an oxygen atom, the organometallic compound defined previously is a tin, lead, antimony, bismuth or germanium organometallic alcoholate. Its preparation can be carried out beforehand by the reaction of a tin, lead, antimony, bismuth or germanium organometallic oxide with a polyol, preferably a diol, in molecular excess relative to the metal oxide.

On the other hand, when the hydroxylating organometallic alcoholate according to the present invention is prepared in situ:

either a tin, lead, antimony, bismuth or germanium organometallic oxide can be reacted with a polyol and preferably a diol in molar excess relative to the organometallic oxide as previously, but in the polymer matrix;

or a halide, preferably a tin, lead, antimony, bismuth or germanium organometallic chloride or bromide can be reacted with an alkali or alkaline-earth alcoholate.

when A is an $NR^3$ group, the tin, lead, antimony, bismuth or germanium organometallic compound is a compound derived from an amino-alcohol containing at least one alcohol function, but capable of containing a greater number. According to the invention, ethanolamine can be advantageously mentioned. In this case, and according to the invention, to synthesize the organometallic amino derivative, it is necessary to prepare this compound before its introduction into the chlorinated polymer or (co)polymer by the reaction of the amino-alcohol with an organometallic alcoholate of the metals mentioned previously and advantageously with an organometallic mono or polymethoxy alcoholate.

Among the chlorinated polymers capable of being employed in the above process, there can be mentioned, as an example, the chlorinated polyethylenes or polypropylenes, poly(vinylidene chloride), chlorinated rubbers such as poly(chloroprene) and preferably poly(vinyl chloride) or PVC.

Among the chlorinated copolymers, there can be mentioned, as an example and in a non-limitative fashion, the copolymers of poly(vinyl chloride) with vinylidene chloride or vinyl acetate or acrylic and methacrylic esters as comonomer.

Alkoxysilane or hydroxyl groups can also be grafted onto mixtures of said chlorinated (co)polymers.

According to a method for implementing the invention, the above process offers the particular interest of not requiring a solvent for its implementation and it can be integrated into any working processes by extrusion, injection, calendering or coating, the grafting of the chlorinated (co)polymer can be carried out between 50° et 250° C. in the powdered or gelled state.

According to another method for implementing the invention, the process is carried out in suspension in a solvent which does not destroy or inhibit the grafting reaction, such as a hydrocarbon solvent like an alkane having 5 to 15 carbon atoms, preferably 12 carbon atoms and it then allows the elimination, with a view to recycling, of the reaction by-products of an organometallic chloride type. In these conditions, the grafting can be carried out superficially on the finished object.

According to yet another method of implementing the invention, the process is carried out in solution in a solvent without destroying or inhibiting the grafting reaction, such as ethereal-type solvents (for example tetrahydrofuran or dioxane).

In the preferred conditions for implementing the process according to the present invention:

the organometallic derivative is a tin derivative
the initial chlorinated copolymer is PVC
the reaction is conducted either, when A represents oxygen, at about 200° C. preferably between 170° and 2100° C., and in the absence of a solvent, for example, advantageously during an extrusion operation. Preferably, the compound used is in this case an alkoxyorganostannic derivative, or, when A represents an amino group, at a more moderate temperature of 50° to 150° C. (about 100° C. for example), in a "dry-blend" technique consisting of mixing the liquid additives to the powder in such a way so as to work on the dry powder, or in suspension in a hydrocarbon-type solvent as defined above, at about 120° C. or on the already shaped copolymer. advantageously, the compound used is in this case the aminoorganostannic derivative. Work can take place at a higher temperature, for example at 140° C., according to the desired grafting rate.

In the case where A represents oxygen and B represents an $(OH)_x$ radical, the reaction medium must contain an excess of hydroxyl functions in relation to metal atoms and notably, about twice as much is used.

By shaped (co)polymer, is meant for example a shaped object based on this (co)polymer, such as a section.

Also a subject of the present invention is the compositions characterized in that they contain a chlorinated (co)polymer and an organometallic derivative corresponding to formula I above and notably the compositions characterized in that they contain a chlorinated (co)polymer and an organometallic compound which is an alkoxy organometallic or aminoorganometallic derivative as defined above. These compositions notably have the ability to be grafted.

In the case where $B=(OH)_x$ and A represents oxygen, in the preferred conditions, the compositions which can be hydroxylated contain a chlorinated (co)polymer and an organometallic oxide, and a polyol in excess relative to said organometallic oxide.

In other preferred conditions, the compositions which can be hydroxylated contain an organometallic halide and an alkaline or alkaline-earth alcoholate, itself hydroxylated.

Finally the present invention relates to shaped objects, characterized in that they contain a composition as defined above or obtained by the processes described above.

When it is said that a composition contains a certain product, it is understood that this contains at least one product of this type, for example at least one chlorinated polymer.

The examples which follow illustrate the invention without however limiting it.

Table I sets out examples of grafting aminopropyltriethoxysilane onto poly(vinyl chloride) with di(aminopropyltriethoxysilane) dibutyltin. The organostannic compound is synthesized beforehand by the reaction of dimethoxydibutyltin (0.034 mole, in excess) on 3-aminopropyltriethoxysilane (0.067 mole) under a nitrogen current in order to eliminate the methanol formed. The thermal stabilizer used for test No. 4 is iso-octyl dioctyltin dithioglycolate at the rate of 2 g per 100 g of polymer.

TABLE I

Grafting of alkoxysilane functions onto PVC by the reaction of di(trialkoxysilane propylamino)dibutyltin

| Examples | concentration silane functions ($10^{-6}$ mol./g) | temperature (°C.) | time (mn) | grafting conditions | concentration[a] silane functions after reaction ($10^{-6}$ mol./g) |
|---|---|---|---|---|---|
| 1 | 50 | 80 | 20 | dry mix | 10.36–11.79 |
| 2 | 50 | 98 | 20 | in suspension in heptane | 13.00–14.64 |
| 3 | 50 | 67 | 20 | in solution in tetrahydrofuran | 21.07–26.07 |
| 4 | 10 | 170 | 4 | in the molten state at 180° C. | |

The reactions were carried out under an inert atmosphere ($N_2$) (with the exception of experiment No. 4).

(a) Determination carried out by silicon atomic emission spectroscopy on the calcination residue of the polymer (before cross-linking and after several purification cycles of the polymer by dissolution in tetrahydrofuran (THF) and reprecipitation from methanol). Two determinations are carried out per sample.

Table II sets out examples of grafting aminopropyltriethoxysilane on poly(vinyl chloride) with aminopropyltriethoxysilanetributyltin. The tests were conducted according to the technique of suspension in dodecane. The tin compound is synthesized beforehand in the dodecane (90 ml) in the first place by the reaction of tributyltin monochloride (0.048 mol.) on sodium methylate (0.050 mol. in excess) to synthesize the methoxytributyltin. The solution is filtered to eliminate the excess sodium methylate and the sodium chloride formed. In the second place, the methoxytributyltin is reacted on the aminopropyltriethoxysilane (0.040 mol) under a nitrogen atmosphere. The solution is left at rest for two hours at ambient temperature then the temperature is taken to the grafting temperature. 30 g of PVC is introduced. All the operations are carried out under a nitrogen atmosphere.

TABLE II

Grafting of alkoxysilane functions onto PVC by the reaction of trialkoxysilanepropylaminotributyltin

| Examples | Temperature °C. | Time mn | Molar % of substitution (a) of chlorine atoms |
|---|---|---|---|
| 5 | 100 | 60 | 1.0 |
| 6 | 126 | 60 | 2.3 |
| 7 | 145 | 5 | 1.40 |
| 8 | 145 | 30 | 6.80 |

(a) Determination carried out by centesimal analysis of chlorine and silicon (before cross-linking and after several purification cycles of the polymer by dissolution in THF and reprecipitation from methanol).

Table III illustrates an example of grafting hydroxypropyltrimethoxysilane on poly(vinyl chloride) with di(trimethoxysilane propanoxy)dibutyltin. The organostannic compound is synthesized beforehand by the reaction of dimethoxydibutyltin (0.034 mole) on trimethoxysilane propylmethacrylate (17.42 g; 0.070 mole, in excess) under a current of nitrogen in order to eliminate the methylmethacrylate formed. In addition iso-octyl di-octyltin dithioglycolate is used as a thermal stabilizer at the rate of 2 g per 100 g of polymer.

TABLE III

Grafting alkoxysilane functions onto PVC by the reaction of bis-(trialkoxysilanepropyloxy) dibutylin

| Examples | concentration silane functions ($10^{-6}$ mol./g) | Temperature (°C.) | Time (mn) | Grafting conditions | concentration[a] silane functions after reaction ($10^{-6}$ mol./g) |
|---|---|---|---|---|---|
| 9 | 191.6 | 170 | 4 | in the molten state at 180° C. | 182 |

(a) Determination carried out by silicon atomic emission spectroscopy on the calcination residue of the polymer (before cross-linking and after several purification cycles of the polymer by dissolution in THF and re-precipitation from methanol).

The polymers modified in this way are used to cross link them by a condensation reaction of their alkoxysilane functions in the presence of water. The process is particularly suitable for surface cross-linking.

They can also be used:
for grafting onto glass fibre by a condensation reaction of the alkoxysilane functions onto the Si-OH functions of the glass;
for a modification of the surface tension of the transformed polymer.

Cross-linking tests on modified polymers

Table IV sets out the cross-linking tests on modified polymers (No. 1 to 9). The modified materials according to the processes described previously (tests in suspension and dry-blend tests) are dissolved in THF. The films formed by the evaporation of the THF (tests in solution, in suspension and "dry-blend") or by pressing (in the molten state) are subjected to heating at 80° C. or 100° C. for 2 to 72 hours after the tests, in a closed chamber in the presence of water vapour. The content of insoluble in the tetrahydrofuran (THF) characterizes the degree of cross-linking of the materials. The samples are put in solution in THF at ambient temperature, after 48 hours of immersion the solution is filtered. The insoluble part is dried in an oven under vacuum for 24 hours at 40° C. The PVC which is soluble in the THF is re-precipitated from methanol, filtered and dried in an oven under vacuum for 24 hours at 40° C. The insoluble content is the relationship of the mass of insoluble polymer over that of the starting sample. (the mass balance is verified by the content of reprecipitated polymer over that of the starting sample).

TABLE IV

Cross-linking of PVC by the condensation reaction of alkoxysilane functions in the presence of water

| Grafted products of examples | Cross-linking conditions retention time oven temperature | Insoluble content |
|---|---|---|
| 1 | 10 hours at 80° C. | 100 |
| 2 | " | 20 |
| 3 | " | 100 |
| 4 | " | 100 |
| 5 | 2 hours at 100° C. | 80 |
| 6 | " | 95 |
| 9 | 4 hours at 100° C. | 32 |
| 9 | 72 hours at 80° C. | 45 |

Table V sets out examples of the hydroxylation of polyvinyl chloride with a hydroxylated organometallic alcoholate of tin, dibutyl dihydroxy-1-ethoxy-2-tin

TABLE V

Hydroxylation of polyvinyl chloride by a hydroxylated organometallic alcoholate of tin, dibutyl dihydroxy-1-ethoxy-2-tin.

| Example | Grafting conditions Reactor | T (°C.) | Ethylene glycol mole · kg$^{-1}$ | Dibutyltin oxide mole · kg$^{-1}$ | Grafted hydroxyl function mole · kg$^{-1}$ |
|---|---|---|---|---|---|
| 10 | internal mixer (4 mn) | 200 | 0.483 | 0.186 | 0.32 |
| 11 | extruder | 170 | 0.483 | 0.186 | 0.10 |
| 12 | extruder + press (10') | 170 | 0.483 | 0.186 | 0.19 |
| 13 | extruder | 205 | 0.483 | 0.186 | 0.19 |

Examples 11, 12 and 13 have been carried out a in Weber type DS45 double screw extruder, screw diameter 45 mm, length 15D, with a die temperature of 170° C. for Examples 11 and 12, and 205° C. for Example 13.

For Example 12, after extrusion, the reactive mixture was heated under a press for 10 minutes at 200° C.

The quantities of hydroxyl functions grated onto the polymer are deduced from the quantity of acetic acid formed by thermal degradation in a thermobalance with a speed of temperature rise programmed at 1.8° C. per minute, from ambient temperature to 330° C. after acetylation of the alcohol functions using acetic anhydride. This determination is carried out on the polymer which has been purified by putting in solution in tetrahydrofuran and reprecipitating from methanol.

The quantity of acetic acid formed is determined by gas phase chromatography using a glass column with an internal diameter of 8 mm, length 1 m, with a FFAP phase reference, commercially available from INTERSMAT, the gas vector being nitrogen with a flow rate of 50 ml per minute, the detector being of flame ionisation type, the hydrogen pressure being 2.2 bars and the air pressure 1.8 bar.

Table VI sets out examples of hydroxylation of polyvinyl chloride with hydroxyalkylaminoalkyltin compounds. The tests were conducted according to the dry blend technique (dry mixing) by mixing the polymer and the reagent and agitating the mixture, while maintaining the temperature at 80° C., for one hour for tests 14 to 18 and for 30 minutes for test 19.

The determination of hydroxyl functions for tests 14 to 18 is carried out as previously by chromatographic determination of the acetic acid released by thermal degradation after acetylation of the alcohol functions using acetic anhydride. For test 19, the content of alcohol functions is deduced by determination of the nitrogen by elementary analysis.

tion of the naphthyl group at 297 nm with the establishment of a calibration curve.

For Examples 21, 22 and 23 the content of grafted hydroxyl groups is deduced from determination by coulometry of the tin chlorides released in the reaction medium by the substitution reaction of chlorine atoms leading to grafting.

All the hydroxylated polyvinyl chlorides according to the invention, Examples 10 to 23, cross-link in the presence of a diisocyanate compound such as hexamethylene diisocyanate.

TABLE VI

Hydroxylation of polyvinyl chloride by hydroxyalkylaminoalkyltin compounds.

| Example | Hydroxyalkylaminoalkyltin compound Nature | concentration mole · Kg$^{-1}$ | Grafted hydroxyl function mole · Kg$^{-1}$ |
|---|---|---|---|
| 14 | $(Bu)_3SnNH-CH_2-CH_2OH$ | 0.3 | 0.11 |
| 15 | $(Bu)_3SnNH-CH_2-CH_2OH$ | 2.0 | 0.12 |
| 16 | $(Bu)_2Sn(NH-CH_2-CH_2-OH)_2$ | 0.3 | 0.10 |
| 17 | $(Bu)_2Sn(NH-CH_2-CH_2-OH)_2$ | 1.0 | 0.16 |
| 18 | $BuSn(NH-CH_2-CH_2-OH)_3$ | 0.66 | 0.15 |
| 19 | $(Bu)_2Sn(NHCH_2-CH_2-OH)_2$ | 0.31 | 0.36 |

TABLE VII

HYDROXYLATION OF POLYVINYL CHLORIDE (PVC) BY HYDROXYLAKYLAMINOALKYL-TIN COMPOUNDS IN SUSPENSION IN DODECANE

| Example no. | Hydroxylating agent Nature | Concentration g/l | Concentration of PVC g/l | Temperature °C. | Duration mn | Grafted hydroxyl function mole/kg |
|---|---|---|---|---|---|---|
| 20 | $Bu_3Sn-N-(CH_2-CH_2OH)_2$ | 173 | 280 | 130 | 120 | 0.62 |
| 21 | $Bu_2Sn-(NH-CH_2-CH_2-OH)_2$ | 94 | 330 | 140 | 90 | 0.37 |
| 22 | $Bu_3Sn-NH-CH_2-CH_2-OH$ | 185 | 330 | 130 | 90 | 0.20 |
| 23 | $Bu_3Sn-NH-CH_2-CH_2-OH$ | 185 | 330 | 130 | 120 | 0.65 |

For all these examples, the hydroxyalkylaminoalkyltin compounds derive from aminoethanol and the R group linked to the tin atom according to the present invention is a butyl (Bu) radical.

Table VII sets out examples of hydroxylation of polyvinyl chlorides with hydroxyalkylaminoalkyltin compounds in suspension in dodecane. In these experimental conditions, the alkyltin chlorides remain soluble in the dodecane and can be advantageously recycled to regenerate the hydroxylating agent after separation of the hydroxylated polymer. Their separation from the polymer is another advantage of the process in suspension with regard to certain applications.

In these examples, the hydroxylating agent is prepared directly in the dodecane by the reaction of alkyltin chlorides with sodium methylate, then after eliminating the sodium chloride, by the reaction of the aminoalcohol on the alkoxyorgano tin compound (tin alcoholate) and eliminating the methanol.

For Example 20, the hydroxyaminoalkyltin compound derives from diethanolamine and for Examples 21, 22 and 23, it derives from ethanolamine. For Examples 20 to 23 the R group linked to the tin atom according to the present invention is a butyl (Bu) radical.

For Example 20, the content of grafted hydroxyl groups is evaluated by near ultraviolet determination after having reacted the alcohol group on naphthylisocyanate. This determination is based on absorp-

We claim:

1. A process for functionalizing chlorinated (co)-polymers comprising reacting said chlorinated (co)-polymer at a temperature of 50° to 250° C. with an organometallic compound of formula (I)

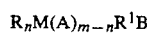

$$R_nM(A)_{m-n}R^1B$$

in which

M represents a tin, lead, antimony or bismuth atom,

A represents an $NR^3$ group in which $R^3$ represents a hydrogen atom or an $R^1B$ radical or A represents an oxygen atom, m is equal to 4 and n is equal to 1, 2 or 3 when M represents tin or lead, m is equal to 5 and n is equal to 1, 2, 3 or 4 when M represents bismuth or antimony, R represents a linear or branched alkyl radical containing 1 to 8 carbon atoms, a cycloalkyl radical containing 3 to 12 carbon atoms, an optionally substituted aryl radical containing 6 to 14 carbon atoms, an optionally substituted aralkyl radical containing 7 to 14 carbon atoms or a cycloalkylalkyl radical containing 4 to 8 carbon atoms, $R^1$ represents a linear or branched alkyl radical containing 1 to 20 carbon atoms, an aralkyl radical containing 7 to 14 carbon atoms, a cycloalkyl radical containing 3 to 12 carbon atoms, an optionally substituted cycloalkylalkyl radical containing 4 to 8 carbon atoms or an arylcycloalkyl radical containing 7 to 20 carbon atoms or a polymer chain, said $R^1$ radical being optionally functionalized, and B represents (1) an $—Si(OR^2)_3$ radical, $R^2$ being able to take the values or R above, or (2) an $(OH)_x$ radical in which x represents an integer which can take values from 1 to 41.

2. Process according to claim 1, wherein the organometallic compound is a tin compound.

3. Process according to claim 1 wherein the initial chlorinated (co)polymer is PVC.

4. Process according to claim 1 further comprising conducting the reaction between 50° and 150° C. in suspension in a hydrocarbon solvent and in the presence of a compound of formula I, in which A represents an amino group.

5. Process according to claim 1 wherein the reaction is conducted at a temperature of 50° to 150° C., according to the "dry-blend" technique and wherein A is an amino group.

6. Process according to claim 1 wherein the reaction is conducted at 170° to 210° C. in the absence of a solvent in the molten state.

7. Process according to claim 1 wherein the reaction is conducted at a temperature of 50° to 150° C. on an already-shaped chlorinated (co)polymer and wherein A is an amino group.

8. A composition containing a chlorinated (co)polymer and a compound of formula I as defined in claim 1.

9. A composition comprising a chlorinated (co)polymer, a polyol and an organometallic oxide in which the metal is tin, lead, antimony or bismuth, said polyol being resent in molar excess relative to said organometallic oxide.

10. A composition comprising a chlorinated (co)polymer, an alkali or alkaline earth alcoholate and an organometallic halide in which the metal is tin, lead, antimony or bismuth.

11. A composition in accordance with claim 8, wherein said compound of formula I is an alkylamino organotin trialkoxysilane or an alkoxyorganotin trialkoxysilane.

12. A functionalized chlorinated (co)polymer produced by the process of claim 1.

13. A shaped object formed of a functionalized (co)polymer in accordance with claim 12.

14. A process in accordance with claim 1 wherein, in said organometallic compound, A is oxygen and $R^1B$ is a polyol and wherein said reacting step comprises reacting said chlorinated (co)polymer with an organometallic oxide and a polyol in molar excess relative to said organometallic oxide, said organometallic compound being formed in situ.

15. A process in accordance with claim 1 wherein, in said organometallic compound, A is oxygen and $R^1B$ is a polyol and wherein said reacting step comprises reacting said chlorinated (co)polymer with an organometallic halide and an alkali or alkaline-earth alcoholate, said organometallic compound being formed in situ.

* * * * *